United States Patent
Takahashi et al.

[11] Patent Number: 5,165,090
[45] Date of Patent: Nov. 17, 1992

[54] SWING-TYPE ACTUATOR

[75] Inventors: Fumihiko Takahashi, Saitama; Teruo Umehara, Hanyu, both of Japan

[73] Assignee: Hitachi Metals, Ltd., Tokyo, Japan

[21] Appl. No.: 705,068

[22] Filed: May 23, 1991

[30] Foreign Application Priority Data

May 24, 1990 [JP] Japan ................ 2-134289

[51] Int. Cl.$^5$ .................. G11B 5/55; G11B 21/08; G11B 17/30; G11B 21/02
[52] U.S. Cl. .................................................. 369/215
[58] Field of Search ............... 369/215, 219, 220; 360/104, 105, 106

[56] References Cited

U.S. PATENT DOCUMENTS

| | | |
|---|---|---|
| 4,150,407 | 4/1979 | Dijkstra . |
| 4,196,456 | 4/1980 | Manzke et al. . |
| 4,544,973 | 10/1985 | Van De Bult . |
| 4,553,058 | 11/1985 | Iwasaki . |
| 4,639,624 | 1/1987 | Ejiri et al. . |
| 4,849,840 | 7/1989 | Fujioka ............... 360/106 X |
| 4,855,853 | 8/1989 | Matsushita et al. . |
| 4,879,617 | 11/1989 | Sampietro et al. . |
| 4,949,194 | 8/1990 | MacPherson et al. ...... 360/106 X |
| 4,951,023 | 8/1990 | Erd et al. . |
| 4,985,652 | 1/1991 | Oudet et al. . |
| 5,034,837 | 7/1991 | Schmitz ............... 360/106 X |

FOREIGN PATENT DOCUMENTS

| | | |
|---|---|---|
| 0067975 | 5/1980 | Japan ................ 360/106 |
| 0019561 | 2/1981 | Japan ................ 360/106 |
| 58-57721 | 4/1983 | Japan . |
| 0124066 | 7/1984 | Japan ................ 360/106 |
| 60-159566 | 10/1985 | Japan . |
| 0142574 | 6/1988 | Japan ................ 360/106 |
| 64-89946 | 4/1989 | Japan . |
| 2-310865 | 12/1990 | Japan . |

*Primary Examiner*—John W. Shepperd
*Assistant Examiner*—Michael C. Kessell
*Attorney, Agent, or Firm*—Finnegan, Henderson, Farabow, Garrett & Dunner

[57] ABSTRACT

A swing-type actuator has (a) a housing including a pair of yokes and a permanent magnet attached to at least one of the yokes opposing each other for defining a magnetic gap therebetween; and (b) a swingable arm having at one end a hold member encompassing a movable coil, such that the hold member and movable coil have essentially the same thickness and the movable coil is swingable in the magnetic gap, the arm and the hold member being integrally formed of a thermoplastic resin having a longitudinal modulus of $30 \times 10^4$ kg/cm$^2$ or more.

3 Claims, 3 Drawing Sheets

SWING-TYPE ACTUATOR

BACKGROUND OF THE INVENTION

The present invention relates to a swing-type actuator such as an actuator for magnetic disk drives, and more particularly to a swing-type actuator capable of swinging a function member such as a magnetic head along a circular course.

Conventionally, the positioning of a magnetic head on a recording track of a magnetic disk, etc. is conducted by a swing-type or rotation-type actuator as shown in FIGS. 4 and 5. In both figures, a yoke 1 is fixedly provided with permanent magnets 2, and a pair of yokes 1 are assembled by supports 3 such that different magnetic poles of the permanent magnets 2 are opposite each other via a magnetic gap 4 to form a magnetic circuit. 5 represents an arm having one end to which a flat movable coil 6 is fixed, and the other end to which a magnetic head (not shown) is fixed. The arm 5 is arranged such that the movable coil 6 located in the magnetic gap 4 can swing around a shaft 7. When an operation signal is supplied to the movable coil 6, a magnetic force generated from the movable coil 6 according to Fleming's left hand rule functions as an attraction force or a repulsion force to each permanent magnet 2, so that the arm 5 is rotated around the shaft 7. As a result, a magnetic head fixed to a tip end of the arm 5 is positioned on a desired magnetic track of a magnetic disk (not shown). The direction of the rotation of the arm 5 can be changed by inverting the direction of current applied to the movable coil 6.

There is also a conventional swing-type actuator shown in FIGS. 6 and 7, which is operated in the same manner as that shown in FIGS. 4 and 5. In this swing-type actuator, because only one of the yokes 1, 1 is provided with permanent magnets 2, 2, the total thickness of the actuator can be reduced. Incidentally, reference numerals in FIGS. 6 and 7 are the same as those in FIGS. 4 and 5, as long as they show the same parts.

In the above conventional actuators for magnetic disk drives, the movable coil 6 is usually fixed to the arm 5 by an adhesive. Incidentally, in the swing-type actuator shown in FIGS. 6 and 7, the arm 5 is fixed to a bobbin 8 having a bottom plate by screws [not shown], and the coil 6 is fixed within the bobbin 8 by an adhesive. However, the fixing of the movable coil 6 by an adhesive is sometimes troublesome, failing to provide accurate positioning of the movable coil 6. In addition, handling of terminals of the movable coil 6 is complicated, lowering the productivity of assembling of the arm 5. Since there is increasingly higher demand for miniaturization and reduction in thickness of magnetic disk drives, it is necessary to improve the positioning accuracy of the movable coil 6, and the productivity and reliability of fixing of the movable coil 6 to the arm 5. In this sense, the conventional arms fail to satisfy these requirements.

To solve the above problems, attempts have been made to integrally fix a movable coil 6 to an arm 5 by an integral resin molding (for instance, Japanese Utility Model Laid-Open No. 60-159556 and U.S. Pat. No. 4,855,853). In such a structure, the movable coil can be supported by a simplified structure, and the thickness of the movable coil can be extremely reduced. Accordingly, such a structure is advantageous for miniaturizing actuators.

However, since the arm 5 is generally made of aluminum alloy by die casting, it has a large specific gravity. Accordingly, it needs a large driving electric power and suffers from a poor response speed.

Recently, portable information and communications equipment have been finding widespread applications, and in such equipment miniaturization, reduction of weight and energy consumption are required much more than in the conventional stationary equipment. Also, a driving actuator having a high response speed is necessary in such equipment. However, the conventional actuators fail to meet such requirements.

OBJECT AND SUMMARY OF THE INVENTION

An object of the present invention is to provide a small and thin swing-type actuator which has a drastically increased response speed.

The swing-type actuator according to the present invention comprises:

(a) a housing comprising a pair of yokes and a permanent magnet attached to at least one of the yokes opposing each other for defining a magnetic gap therebetween; and (b) a swingable arm having one end to which a hold member encompassing a periphery of a movable coil is fixed and the other end to which a function member is fixed, such that the movable coil is swingable in the magnetic gap, the arm and the hold member being integrally formed of a thermoplastic resin having a longitudinal modulus of $30 \times 10^4$ kg/cm$^2$ or more.

DETAILED DESCRIPTION OF THE PREFERRED EMBODIMENTS

Figure 1:
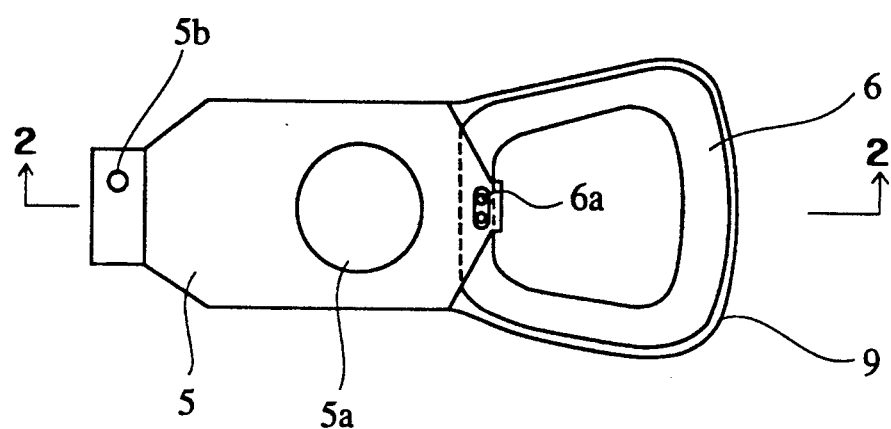
FIG. 1 is a plan view showing the swing-type actuator according to the present invention.
Figure 2:
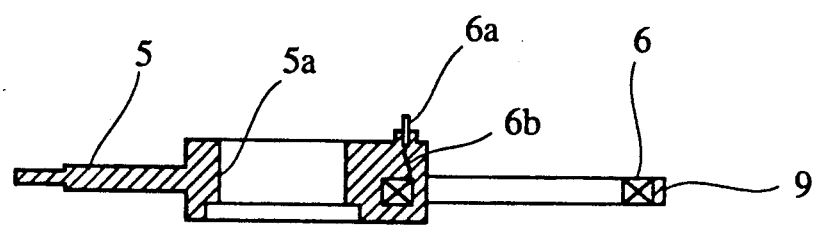
FIG. 2 is a cross-sectional view taken along the line 2—2 in FIG. 1.
Figure 4:
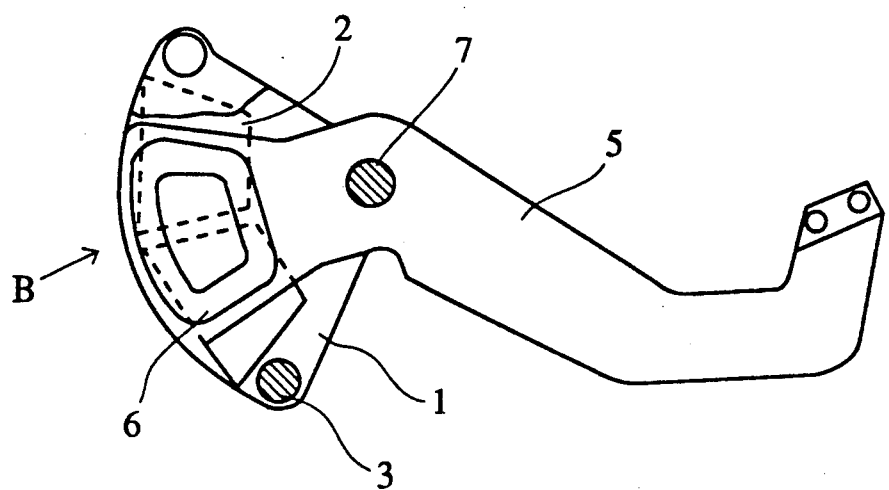
FIG. 4 is a partially cross-sectional plan view showing one conventional swing-type actuator.
Figure 5:
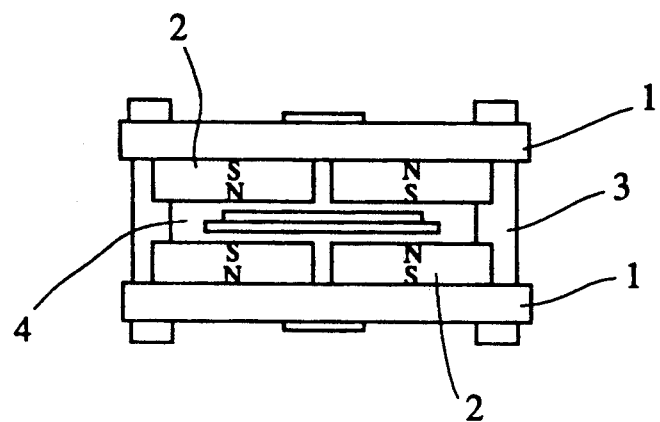
FIG. 5 is a side view of the swing-type actuator of FIG. 4 when viewed from B.
Figure 6:
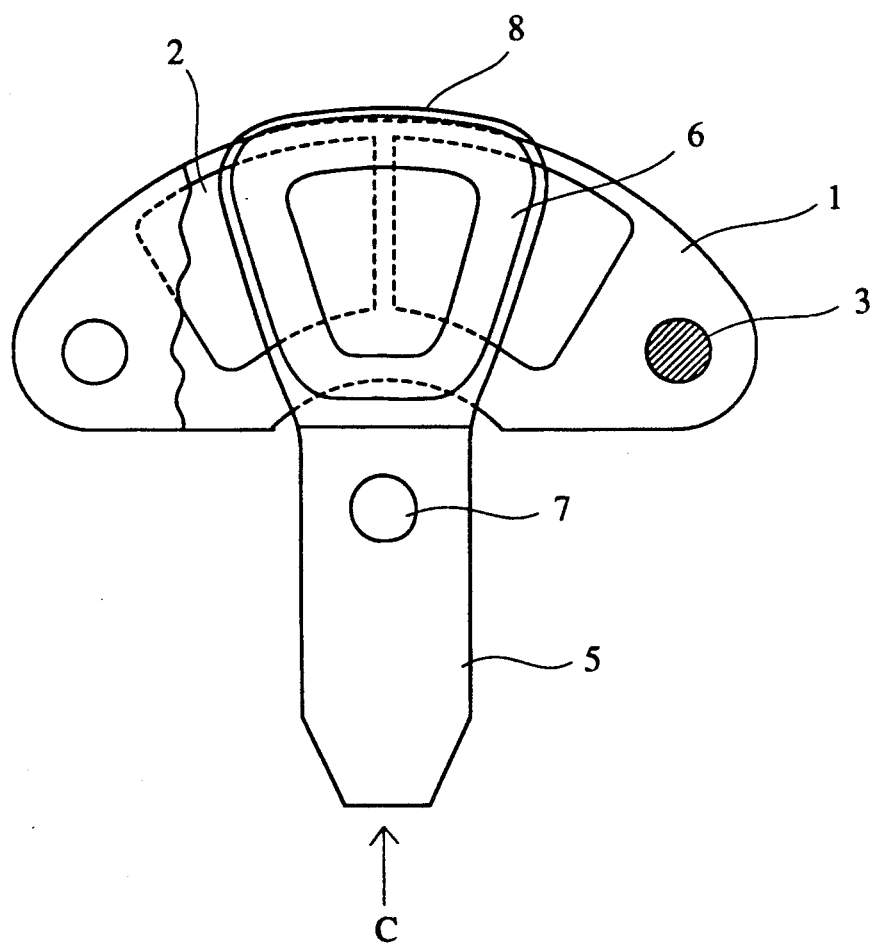
FIG. 6 is a partially cross-sectional plan view showing another conventional swing-type actuator.
Figure 7:
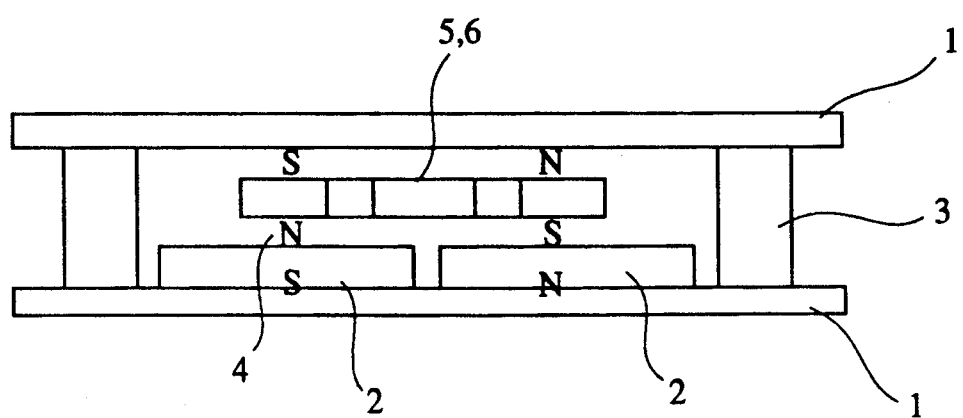
FIG. 7 is a side view of the swing-type actuator of FIG. 6 when viewed from C.

Referring to FIGS. 1 and 2 in which the same reference numerals are assigned to the same parts as those in FIGS. 4 and 5, an arm 5, which is produced from a thermoplastic resin having a longitudinal modulus of $30 \times 10^4$ kg/cm$^2$ or more, has an aperture 5a in a center portion. A shaft (not shown) is rotatably fitted in the aperture 5a, so that the arm 5 is rotatably supported by a housing (not shown). The arm 5 is also provided with an aperture 5b at one end for mounting a function member (not shown) such as a magnetic head to the arm 5. A hold member 9, which is formed of a thermoplastic resin, encompasses the movable coil 6. 6a represents terminal pins, and 6b represents lead wires of the movable coil 6. Incidentally, the movable coil 6 can be produced by winding a wire which has a self-melting coating around a core wire at a predetermined number of turns to form a multi-layer coil and then flowing current through this coil to generate heat for integrally fusing the wire.

In the present invention, the arm 5 and the hold member 9 are integral to each other, and they are preferably formed by injection molding. In the injection molding, the movable coil 6 having lead wires 6b to which terminal pins 6a are soldered is placed in an injection mold, and a molten thermoplastic resin (containing carbon fibers, if desired) are injected into the mold. After solidification, the resulting molding is taken out of the mold. By injection molding, the arm 5 and the hold member 9 are integrally molded.

Figure 3:
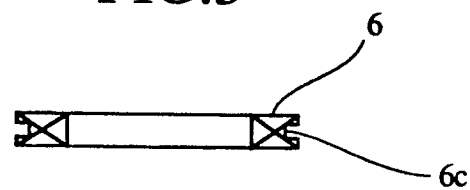
FIG. 3 is a cross-sectional view showing a movable coil according to another embodiment of the present invention.

FIG. 3 shows a movable coil 6 according to another embodiment of the present invention. In FIG. 3, 6c represents a circumferential groove of the movable coil 6 for preventing the movable coil 6 from being detached from the hold member 9. The groove 6c is formed in the winding of the movable coil 6. This groove 6c functions to increase the fixing strength of the movable coil 6 to the hold member 9.

The thermoplastic resins for constituting the arm 5 and the hold member 9 may be selected depending upon rigidity and heat resistance required for them. Examples of such thermoplastic resins include polyarylene sulfide resins such as polyphenylene sulfides, polyamide resins, polyimide resins, polyamideimide resins, polyester resins such as polybutylene terephthalate, polybutylene naphthalate, etc. These thermoplastic resins are preferably heat-resistant resins.

To increase the longitudinal modulus, mechanical strength and heat resistance, reinforcing fibers such as glass fibers, carbon fibers, etc. may be added to the thermoplastic resins. The amount of such reinforcing fibers is 10–50 weight %, preferably 20–40 weight %.

The thermoplastic resins with or without reinforcing fibers should have a longitudinal modulus of $30 \times 10^4$ kg/cm$^2$ or more (measured according to ASTM D-638), and the longitudinal modulus is preferably $36 \times 10^4$ kg/cm$^2$ or more. When the longitudinal modulus is lower than $30 \times 10^4$ kg/cm$^2$, the accurate positioning of a magnetic head fixed to the swingable arm cannot be achieved due to the deformation of the arm 5 and the hold member 9. If the thermoplastic resins having a longitudinal modulus less than $30 \times 10^4$ kg/cm$^2$ are used, reinforcing fibers should be added to increase the longitudinal modulus.

By the above structure, the weight of the arm 5 can be drastically reduced compared to a case where it is made of an aluminum alloy (specific gravity: 2.6), because the thermoplastic resins have much smaller specific gravities. For instance, a carbon fiber-reinforced thermoplastic resin has a specific gravity of 1.4–1.6. Accordingly, an access time can be reduced from 18 msec (in the case of the aluminum alloy) to 14 msec (in the case of carbon fiber-reinforced thermoplastic resin). Incidentally, since the carbon fiber-reinforced thermoplastic resin has a longitudinal modulus of $40 \times 10^4$ kg/cm$^2$, it is sufficiently strong, comparable to the aluminum alloy having a longitudinal modulus of $68 \times 10^4$ kg/cm$^2$.

In the preferred embodiment, the hold member 9 encompassing the movable coil 6 has substantially the same thickness as that of the movable coil 6. Accordingly, the magnetic gap can be reduced, leading to increased driving force and response speed.

In the above embodiment, the actuators for magnetic heads are described, but it should be noted that the swing-type actuator of the present invention can be applicable not only to magnetic heads but also to optical heads, etc.

The swing-type actuator according to the present invention has the following advantages:

(1) Since movable parts including the arm and the hold member have a greatly reduced weight, the access time is more than 20% shorter than that of the conventional actuators.
(2) Since energy consumption necessary for driving the actuator is drastically decreased, the swing-type actuator of the present invention is suitable for portable equipments such as lap-top personal computers.
(3) Since movable parts are integrally formed, the productivity of the swing-type actuator is greatly increased, leading to low production cost.

What is claimed is:

1. A swing-type actuator comprising:
   (a) a housing comprising a pair of yokes opposing each other and a permanent magnet attached to at least one of said yokes for defining a magnetic gap therebetween;
   (b) a coil having a periphery and a thickness for being movable through said magnetic gap;
   (c) a hold member encompassing the periphery of the movable coil, wherein said hold member and said movable coil have substantially the same thickness; and
   (d) a swingable arm having one end to which said hold member is fixed and the other end to which a function member is fixable, said movable coil being swingable by said arm in said magnetic gap, said arm and said hold member being integrally formed of a thermoplastic resin having a longitudinal modulus of $30 \times 10^4$ kg/cm$^2$ or more.

2. The swing-type actuator according to claim 1, wherein said thermoplastic resin is a fiber-reinforced thermoplastic resin.

3. The swing-type actuator as in claim 1, wherein said coil includes groove means formed in said periphery for receiving said hold member.

* * * * *